United States Patent [19]

Vasseur, Jr.

[11] Patent Number: 4,953,318
[45] Date of Patent: Sep. 4, 1990

[54] FISHING ROD HOLDER

[76] Inventor: Adrian Vasseur, Jr., 2600 Wichita, Lot 65, Pasadena, Tex. 77502

[21] Appl. No.: 377,898

[22] Filed: Jul. 10, 1989

[51] Int. Cl.⁵ .............................................. A01K 93/00
[52] U.S. Cl. .................................... 43/21.2; 248/511; 211/195; 224/922
[58] Field of Search ...................... 43/1, 15, 18.1, 21.2; 248/157, 166, 170, 439, 172, 173, 178, 188.6, 231.4, 216.4, 216.6, 511, 512, 528, 529; 224/920, 922, 44.5; 211/195, 70.8; 294/141

[56] References Cited

U.S. PATENT DOCUMENTS

| | | | |
|---|---|---|---|
| 3,546,805 | 8/1968 | Schaeffer | 43/21.2 |
| 3,678,619 | 7/1972 | Carlson | 248/439 |
| 4,003,612 | 1/1977 | Munsell | 211/70.8 |
| 4,311,262 | 1/1982 | Morin | 43/21.2 |
| 4,479,322 | 10/1984 | Koppel | 43/21.2 |
| 4,523,403 | 6/1985 | Ivy | 43/21.2 |
| 4,779,914 | 10/1988 | Friedline | 211/70.8 |

Primary Examiner—Kurt Rowan
Assistant Examiner—Michael William Starkweather
Attorney, Agent, or Firm—Pravel, Gambrell, Hewitt, Kimball & Krieger

[57] ABSTRACT

An apparatus for holding or carrying fishing rods having a pivotable rod support arm and two pivotable support stands which can function as legs for the apparatus or as carrying fixtures for fishing rods when the apparatus is carried in a vertical position. Also included is a spill-proof tackle box which has a lid which fits flush with the tops of the tackle compartments therein.

20 Claims, 3 Drawing Sheets

//4,953,318

FISHING ROD HOLDER

FIELD OF THE INVENTION

This invention is in the field of equipment used to hold fishing rods while fishing or to hold fishing rods for carrying purposes.

BACKGROUND

In many types of fishing it is desirable to be able to use more than one fishing rod for various reasons. Among these reasons are that it can be useful to have several rods with a different type of lure attached to each rod for lure fishing, or while bait fishing it can be useful to have several rods set out so that several baits can be in the water at any given time. In either case, carrying numerous fishing rods simultaneously can be awkward because many fishing rods are comparatively lengthy and because modern rod and reel combinations have a plurality of guides positioned along the length of the rod for guiding the fishing line. Not only can these guides become tangled with each other or catch on surrounding structure, they also hold the fishing line out away from the rod, creating the likelihood of tangling several rods and their respective fishing lines together. It is useful, therefore, to have a device which can carry several rods in an orderly fashion and spaced apart a sufficient amount to insure that there is no interference between the rods themselves, their reels, the guides or the fishing lines.

In the case of bait fishing, it can also be helpful to have a support or stand which will support several rods at approximately 45° from the horizontal in a secure fashion, so that the bait can be cast into the water and then the rod placed on the holder. If the holder is properly configured and sufficiently heavy, and if the rod mounts on the holder are sufficiently secure, the holder can secure the rod against being lost when a fish takes the bait. A properly configured holder would also position the rod and reel combination so that it can be easily picked up by the fisherman in order to play the fish or to set the hook. Here again, it is essential that the placement of the rods be so that there will be no tangling among the various rods positioned on the single rod holder.

Finally, in the case of lure fishing, even though the fisherman fishes with only one rod and reel combination at a time, he may desire to have several lures ready to use, depending upon the depth of water encountered, the clarity of the water, the type and amount of vegetation in the water, and even depending upon the vegetation surrounding the water. A lure fisherman will therefore frequently desire to have two or three or even more rods rigged with different lures and ready for use. It is desirable to have a rod holder which the lure fisherman can use to hold his rods in an easily accessible position while preventing tangling among the various rods on the holder.

Many fisherman will fish with lures or with bait at various times depending upon the season and the type of fish being sought. Therefore, a given fisherman may require a rod holder which can be used as a carrier or as a holder for bait fishing or as a holder or rack for the numerous rods used in lure fishing. It can also be highly desirable to have a rod holder upon which the rods can be stored in between fishing trips.

SUMMARY OF THE INVENTION

This invention is an apparatus which can be used for hanging rods in storage, as on a wall, which can be used as a rod carrier while transporting fishing rods to the fishing site and back, and which can be used as a rod holder suitable either for bait fishing or lure fishing. This apparatus can be used in a boat, if desired, and it is particularly suited for fishing on a pier or dock or on a bank along side the fishing water.

DETAILED DESCRIPTION OF THE INVENTION

Figure 1:
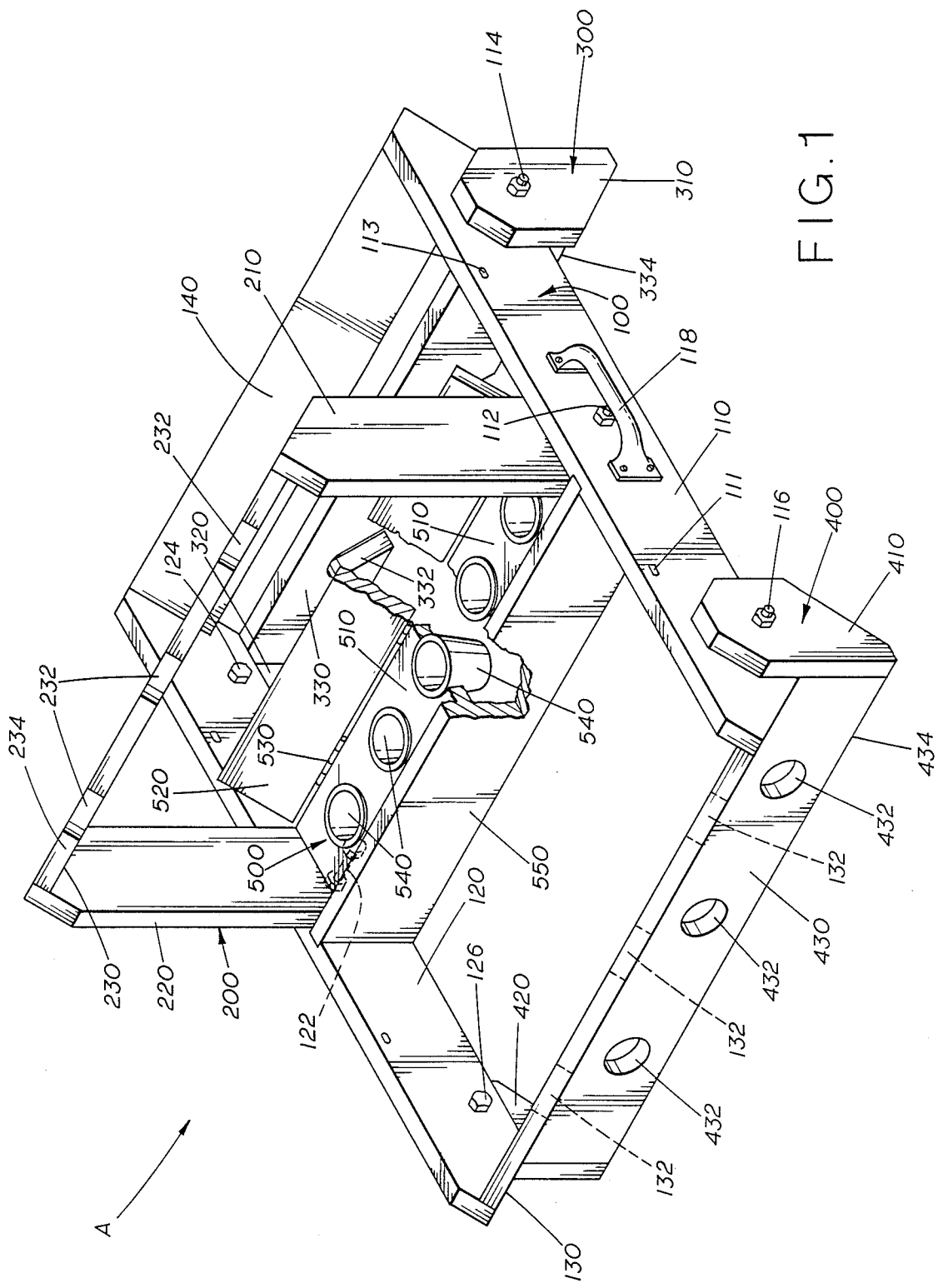
FIG. 1 is a perspective view of the apparatus of the present invention in the fishing configuration.

As seen in FIG. 1, the apparatus of this invention has as its basic member a frame 100 which is rigid and generally rectangular in shape. Frame 100 is shown constructed of flat elongate members such as pieces of wood but it could also easily be made of light metal or plastic. It will also be seen that the general shape of each element of the frame and the other members, instead of being flat, could be in the shape of bars or channels.

Frame 100 has an upper side 110 and a lower side 120, where upper and lower refer to the relative positions of these sides when the apparatus is being carried with the frame generally in a vertical plane. Further explanation will follow as to the method and reason for carrying the apparatus in such a fashion. Frame 100 also has ends 130 and 140, where end 130 has bored therein a plurality of holes 132 which are used to receive the butts of a plurality of fishing rods. End 140 is blank, having no holes or other perforations. Ends 130 and 140 are canted with respect to the plane of frame 100 so that the holes 132 through end 130 have their axes oriented approximately 45° to the plane of frame 100. End 140 is similarly canted in order to lie parallel to another element of the apparatus when in the storage position.

Attached to frame 100 near the midway point between ends 130 and 140 is rod support arm 200 which is composed generally of parallel legs 210 and 220 connected rigidly to cross member 230. Upper leg 210 is pivoted from upper frame side 110 about upper pivot point 112. Similarly, lower leg 220 is pivoted from lower frame side 120 about lower pivot point 122. Cross member 230 is rigidly attached to the outer ends of legs 210 and 220 at such an angle that when legs 210 and 220 are perpendicular to frame 100 the axes of depressions 232 in cross member 230 will be approximately parallel to the axes of holes 132 in frame end 130. Depressions 232 are provided in cross member 230 in order to position and hold a plurality of fishing rods in a spaced apart fashion along cross member 230. Rod support arm 200 can pivot down until it is resting within frame 100 so that legs 210 and 220 are parallel and adjacent to frame sides 110 and 120, respectively, and cross member 230 is parallel and adjacent to frame end 140.

Figure 4:
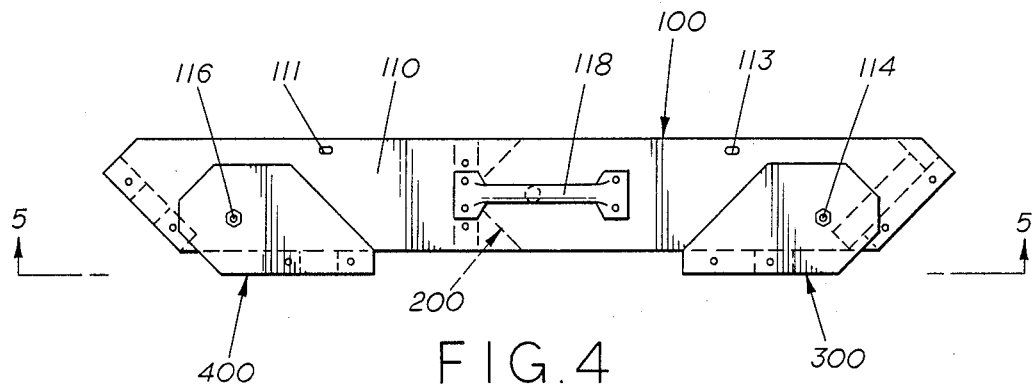
FIG. 4 is a side elevation view of the apparatus of the present invention in the fully closed storage position.

Attached to frame upper and lower sides 110 and 120, near frame end 140, is a slotted support stand 300 which has a dual function as will be described later. Slotted support stand 300 has upper leg 310 and lower leg 320 which pivot from upper frame side 110 and lower frame side 120 about pivot points 114 and 124, respectively. Attached to legs 310 and 320 is cross member 330 which is rigidly attached thereto at an angle such that slotted support stand 300 can be pivoted until cross member 330 is perpendicular to the plane of frame 100 as shown. Slotted support stand 300 can also be pivoted until cross member 330 is parallel to the plane of frame 100 as shown in FIG. 4. Cut into cross member 330 are a plurality of slots which slope upwardly toward upper leg 310 for the purpose of carrying a plurality of fishing rods as will be explained later.

Attached to upper and lower frame sides 110 and 120, near frame end 130, is a second support stand 400 which has the same general shape as support stand 300. Upper leg 410 and lower leg 420 are attached to frame 100 and pivot about upper pivot point 116 and lower pivot point 126. Rigidly attached between legs 410 and 420 is cross member 430 at such an angle as to permit support stand 400 to be pivoted until cross member 430 is perpendicular to the plane of frame 100, or to be pivoted until cross member 430 is parallel to the plane of frame 100 as in FIG. 4. Cut transversely through the cross member 430 are a plurality of holes 432 which are used to receive the butts of fishing rods when the apparatus is used to perform its carrying function. Holes 432 are arranged so as to generally align with slots 332 in slotted support stand 300, when support stands 300 and 400 are pivoted perpendicular to the plane of frame 100 as shown.

Attached to the top of upper frame side 110 is handle 118 for the purpose of carrying the apparatus in the generally vertical position for use as a fishing rod carrier. The location of handle 118 along upper frame side 110 is determined by the approximate center of gravity of the apparatus with fishing rods installed in the carrying mode.

Bridging between upper frame side 110 and lower frame side 120 is spill-proof tackle box 500 which is composed generally of body 510, lid 520 and cross member 550. Tackle storage cups 540 are mounted in holes cut into body 510 so that the upper lip of each cup 540 is flush with the upper surface of body 510. Lid 520 is attached to body 510 by means of hinges 530. When lid 520 is closed on the top of body 510 it completely seals cups 540 against loss of their contents and against the intermingling of contents between cups 540. This ensures that fishing tackle items can be stored and maintained separately even when the apparatus is carried in its vertical position. Tackle box 500 is rigidly mounted between upper frame side 110 and lower frame side 120 in such a position as to limit the upward pivoting of rod support arm 200. The positioning of the attachment of cross member 550 will generally be so as to establish the upper limit of this pivoting where legs 210 and 220 are perpendicular to the plane of frame 100. It can easily be seen that tackle box 500 could be located on either side of rod support arm 200 and the direction of pivoting of rod support arm 200 could be toward either end 130 or end 140 as shown. Other means of limiting the pivoting of various elements 200, 300 and 400 can also be used such as by drilling holes (not shown) through the frame 100 and through the pivoting element and placing pins therein, to hold the pivoting element in the desired position.

Figure 2:
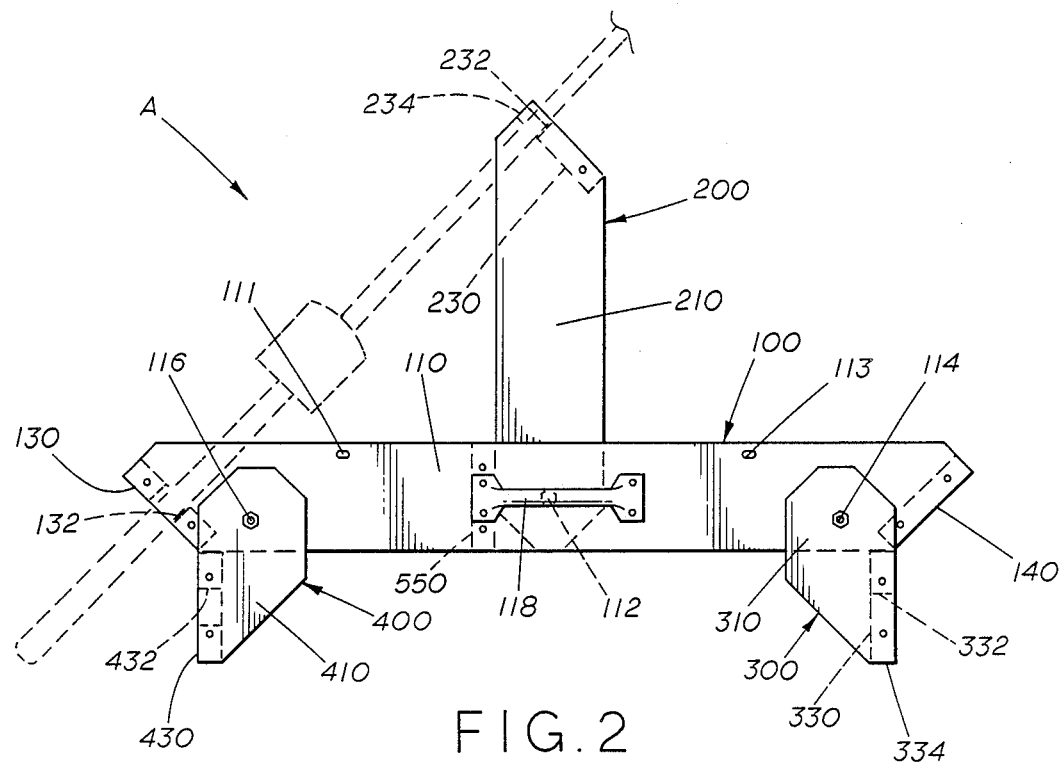
FIG. 2 is a side elevation view of the apparatus of FIG. 1.

Use of the apparatus of the present invention will now be described. When using the apparatus at the fishing site for supporting the fishing rods, rod support arm 200 is pivoted until it is vertical to the plane of frame 100 as shown in FIG. 2. If desired, it can be pinned in this position. Similarly, support stands 300 and 400 are pivoted until cross members 330 and 430 are perpendicular to the frame 100. This causes cross members 330 and 430 to function as legs to hold frame 100 off of the surface on which it rests. With rod support arm 200 in the vertical position, fishing rods can be placed in the apparatus with the butt end extending through one of the holes 132 and with the rod end lying in the corresponding depression 232, thereby holding the fishing rod at approximately 45° to the horizontal. If desired, the angle of tilt can be increased by leaving support stand 400 flat against frame 100 so that the proximal end of frame 100 rests substantially on the ground. This can be desirable if larger fish are anticipated. This position of support stand 400 can also be used if the butt of the fishing rod is short, in order to insure that the reel will not be resting against frame. In either of these positions the fishing rods can be accessible to the lure fisherman who has attached a different lure to each rod and the rods can be accessible to the bait fisherman who has several baits in the water simultaneously. This position also makes the spill-proof tackle box accessible by opening lid 520. By virtue of the fact that the fishing rods are held at approximately 45° to the horizontal and by virtue of the fact that the apparatus extends beyond rod support arm 200 toward the water, a strike by a fish on one of the fishing rods held therein will be resisted by the weight of the apparatus until the fisherman can pick up the rod.

Figure 3:
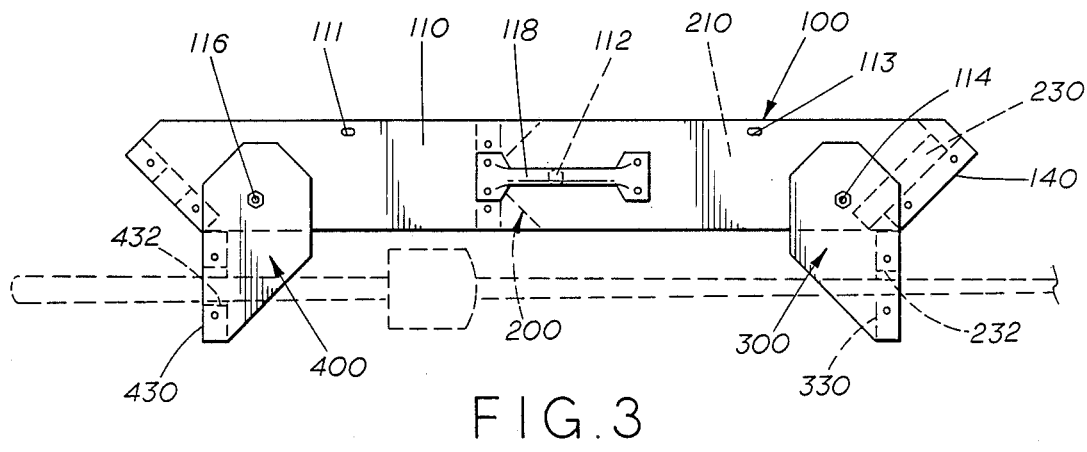
FIG. 3 is a plan view of the apparatus of the present invention in the carrying position.

Referring to FIG. 3, the carrying configuration of the apparatus can be seen. Here, rod support arm 200 is pivoted downward until it is stored within frame 100 so that cross member 230 is parallel to and abutting frame end 140. Support stands 300 and 400 are still pivoted so that cross members 330 and 430 are perpendicular to the plane of frame 100. The fishing rods to be carried are held by the support stands by placing the butt of each rod into one of the holes 432 and by resting the forward section of the rod in the corresponding slot 332. This holds the fishing rods generally in a parallel arrangement in a vertical plane parallel to the plane of frame 100. The apparatus can also be used in this configuration to store the fishing rods on a wall for which purpose screw eye 111 and 113 are provided.

Figure 5:
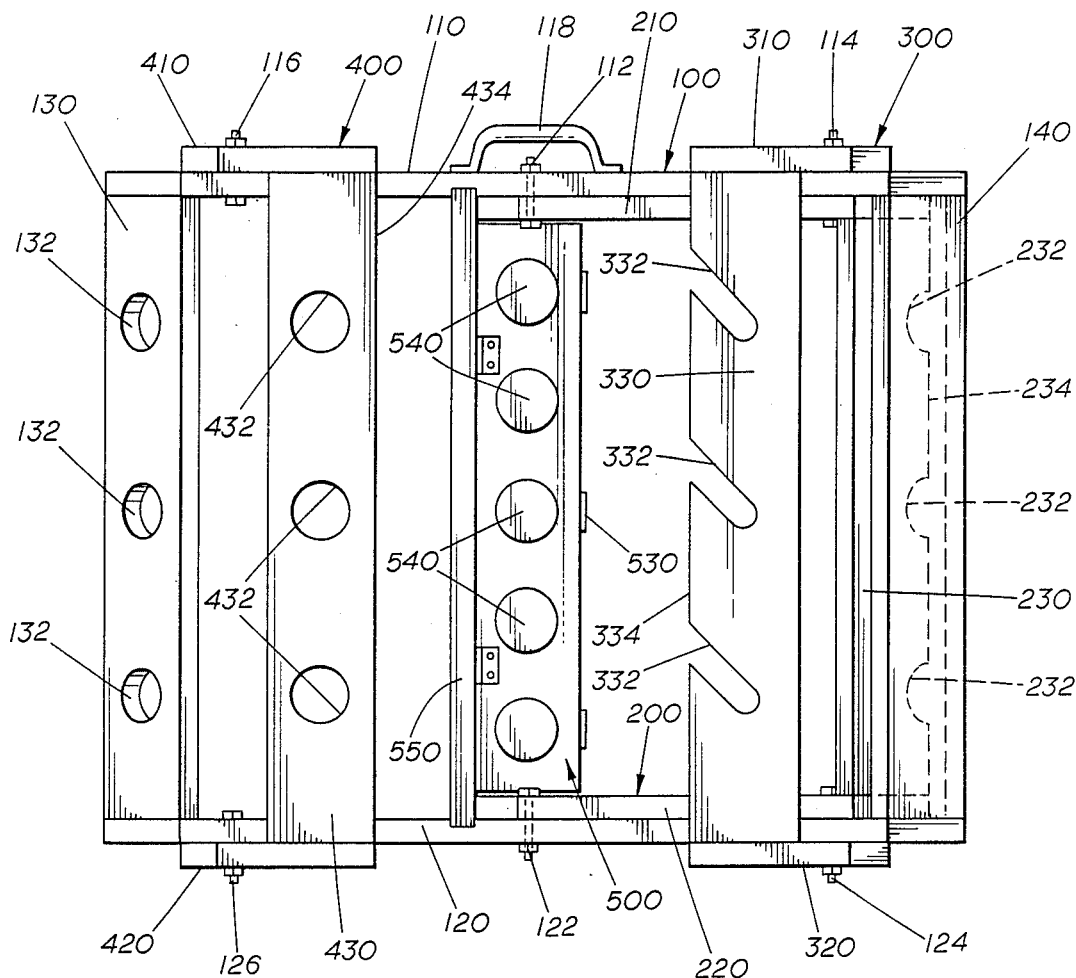
FIG. 5 is a plan view of the apparatus of the present invention in the fully closed storage position.

Finally, referring to FIG. 4 and FIG. 5, the fully closed storage position of the apparatus can be seen. Rod support arm 200 is pivoted within frame 100 as before and support stands 300 and 400 are pivoted so that cross members 330 and 430 are flat against the edges of frame sides 110 and 120. Here again, the apparatus can be stored on a wall by use of screw eyes 111 and 113. Alternatively, in this configuration, the apparatus can be stored in a relatively narrow space.

The embodiment of the invention described here is intended to illustrate the inventive aspects by way of example. It will be obvious to those skilled in the art that these inventive aspects can be duplicated through various modifications which are essentially equivalent. To the extent that any such modifications are equivalent, it is intended that they be covered by the following claims.

I claim:

1. An apparatus for holding one or more fishing rods comprising:
   a frame;
   a rod support arm rotatably mounted to the frame at a point substantially midway of two opposing sides of the frame and which can upwardly rotate between a stored position parallel to the frame and a support position perpendicular to the frame;
   a first support stand mounted to one end of the frame, which is perpendicular to the frame and which has means for inserting a portion of a fishing rod;
   a second support stand mounted to the other end of the frame, which is perpendicular to the frame and which has means for inserting a portion of a fishing rod; and
   wherein the support arm operates in the support position to hold the fishing rod in a fishing position and rotates to a stored position when said fishing rod is supported by said first and second support stands in a carrying position.

2. The apparatus of claim 1, wherein the frame is rectangular.

3. The apparatus of claim 2, wherein the rod support arm forms three sides of a rectangle pivoted about pivot points near free ends of two opposing sides of the rectangle.

4. The apparatus of claim 3, wherein the pivot points on the rod support arm are co-linear with pivot points on two opposite sides of the frame, so that when the rod support arm is in the stored position, its two sides having pivot points are parallel to and adjacent to the two sides of the frame which have pivot points.

5. The apparatus of claim 4, wherein when the rod support arm is in the stored position, the third side of the rod support arm is parallel to and adjacent to a third side of the frame.

6. The apparatus of claim 2, wherein the first support stand forms three sides of a rectangle pivoted about pivot points on two opposing sides of the rectangle and about pivot points on two opposing sides of the frame, near a third side of the frame.

7. The apparatus of claim 6, wherein the second support stand forms three sides of a rectangle pivoted about pivot points on two opposing sides of the rectangle and about pivot points on the two opposing sides of the frame, near a fourth side of the frame.

8. The apparatus of claim 1, further comprising:
   a first stop means for supporting the rod support arm in its support position perpendicular to the frame;
   a second stop means for supporting the first support stand in its active position perpendicular to the frame; and
   a third stop means for supporting the second support stand in its active position perpendicular to the frame.

9. The apparatus of claim 1, further comprising positioning means on the rod support arm for holding a plurality of fishing rods in position when the rod support arm is in its support position.

10. The apparatus of claim 9, wherein the positioning means are a plurality of spaced apart depressions.

11. The apparatus of claim 4, wherein the third side of the rod support arm supports the fishing rods at an angle of approximately 45° to the horizontal when the rod support arm is in its support position and when the frame is placed horizontally.

12. The apparatus of claim 1, wherein the means for supporting fishing rods in the first support stand are a plurality of slots formed at an oblique angle to the vertical so as to hold a plurality of fishing rods substantially horizontally, arranged in a vertical plane parallel to the plane of the frame when the first support stand is in its active position and when the frame is carried vertically.

13. The apparatus of claim 1, wherein the means for holding fishing rod butts are a plurality of holes formed in the third side of the second support stand so as to hold a plurality of fishing rods substantially horizontally, arranged in a vertical plane parallel to the plane of the frame when the second support stand is in its active position and when the frame is carried vertically.

14. The apparatus of claim 1, further comprising a handle on a side of the frame for carrying the frame in a vertical plane.

15. The apparatus of claim 1, wherein the inactive positions of the first and second support stands position those stands compactly with the frame for storage of the apparatus.

16. The apparatus of claim 1, wherein the active positions of the first and second support stands position those stands substantially perpendicular to the frame for selectively supporting the frame, as legs, in the horizontal position for fishing, and for holding fishing rods substantially horizontally, arranged in a vertical plane when the frame is carried vertically.

17. The apparatus of claim 1, further comprising:
   a tackle box mounted on the frame;
   a plurality of compartments in the tackle box for separate storage of fishing tackle; and
   a lid on the tackle box which closes securely on the compartments so as to separate each compartment individually from the other compartments and from the outside of the tackle box.

18. The apparatus of claim 1 wherein said first support stand is rotatably mounted to the frame and can rotate from the position perpendicular to the frame to another position parallel to the frame.

19. The apparatus of claim 1 wherein said first and second support stands are rotatably mounted to the frame and can rotate from the position perpendicular to the frame to another position parallel to the frame.

20. The apparatus for holding fishing rods, comprising:
   a rectangular frame;
   a rod support arm mounted on the frame having two parallel legs, each of which is pivoted at an end thereof about a first pivot axis running perpendicular to two opposing sides of the frame at a point substantially midway of the two opposing sides;
   a first cross member on the rod support arm connecting the ends of the parallel legs distal the pivot ends of the parallel legs;
   a plurality of depressions on the first cross member for positioning a plurality of fishing rods along the cross member;
   a first pivot stop means on the frame for stopping the pivoting of the rod support arm at a position which will support the fishing rods at an angle of approximately 45° when the frame is placed horizontally;
   a plurality of rod positioning holes in an end of the frame not used for mounting of the rod supporting arm, into which the butts of the plurality of fishing rods can be placed while the fishing rods are supported at an angle by the rod support arm;
   a first support stand mounted on the frame having two parallel legs, each of which is pivoted about a second pivot axis at a point proximal an end of the frame;

a second cross member on the first support stand connecting the ends of the parallel legs distal the pivot points of the parallel legs;

a plurality of slots on the second cross member at an oblique angle to the horizontal when the frame is carried in a vertical plane, for holding a plurality of fishing rods substantially horizontally, arranged in a vertical plane parallel to the plane of the frame;

a second pivot stop means on the frame for stopping the pivoting of the first support stand substantially perpendicular to the plane of the frame to selectively support the frame horizontally, as legs, and to hold a plurality of fishing rods in the slots when the frame is carried vertically;

a second support stand mounted on the frame having two parallel legs, each of which is pivoted at one end thereof about a third pivot axis running parallel to the second pivot axis at a point proximal an end of the frame distal the second pivot axis;

a third cross member on the second support stand connecting the ends of the parallel legs distal the pivot points of the parallel legs;

a plurality of holes in the third cross member through which the butts of a plurality of fishing rods can be inserted for holding, in cooperation with the slots in the second cross member, a plurality of fishing rods substantially horizontally, arranged in a vertical plane when the frame is carried vertically;

a third pivot stop means on the frame for stopping the pivoting of the second support stand substantially perpendicular to the plane of the frame to selectively support the frame horizontally as legs, and to hold a plurality of fishing rods in the holes when the frame is carried vertically.

* * * * *